United States Patent [19]

Le Barny et al.

[11] Patent Number: 5,264,512
[45] Date of Patent: Nov. 23, 1993

[54] AMORPHOUS COPOLYMERS, TRANSPARENT IN THE VISIBLE RANGE, FOR NON-LINEAR OPTICAL APPLICATIONS

[75] Inventors: Pierre Le Barny, Orsay; Dominique Broussoùx, Marcoussis, both of France

[73] Assignee: Thomson-CSF, Puteaux, France

[21] Appl. No.: 721,306

[22] Filed: Jun. 26, 1991

[30] Foreign Application Priority Data

Jun. 29, 1990 [FR] France .................. 90 08233

[51] Int. Cl.$^5$ .................................. C08F 220/50
[52] U.S. Cl. ........................ 526/298; 526/245; 526/292.2
[58] Field of Search ............ 526/298, 245, 292.2

[56] References Cited

U.S. PATENT DOCUMENTS 4,894,263  1/1990  Dubois et al. ................. 428/1
4,915,491  4/1990  De Martino et al. ........... 526/298

OTHER PUBLICATIONS

Molecular Crystals And Liquid Crystals, vol. 137, 1986, pp. 349-364, Gordon and Breach, Science Pub., US; J.-C. Dubois et al.: "Liquid crystalline side chain polymers derived from poly-acrylate, poly-methacrylate and poly-α-chloracrylate".

Primary Examiner—Joseph L. Schofer
Assistant Examiner—Mark Nagumo
Attorney, Agent, or Firm—Oblon, Spivak, McClelland, Maier & Neustadt

[57] ABSTRACT

The invention is a family of amorphous copolymers, transparent in the visible range, for use in non-linear optical applications. The copolymers are produced by copolymerizing an alkyl methacrylate or an alkyl acrylate or a γ alkyl acrylate halide or an alkyl phenylacrylate or a γ trifluoromethyl acrylate with a monomer containing the entity which generates the second-order non-linear effects.

10 Claims, 3 Drawing Sheets

WHERE R IS H OR CH₃
$2 \leq m \leq 11$
X IS -O- OR -COO-
n IS THE DEGREE OF POLYMERIZATION WHERE R₁ IS CH₃, H, F, Cl, CF₃ OR R₂ IS CH₃, H, F, Cl, CF₃ OR x IS A MOLE FRACTION DEPENDING ON THE NATURE OF THE X GROUP
IF X IS -N- WHERE $1 \leq p \leq 3$ THEN $0 < x < 1$
     |
   C$_p$H$_{2p+1}$ IF X IS -O- OR -S- THEN $0 < x < 1$
$1 \leq n \leq 8$
m = 0 OR $2 \leq m \leq 10$
y = 1 OR y = 2

AMORPHOUS COPOLYMERS, TRANSPARENT IN THE VISIBLE RANGE, FOR NON-LINEAR OPTICAL APPLICATIONS

BACKGROUND OF THE INVENTION

The invention consists of copolymers with their maximum absorption wavelength below 350 nm, usable in non-linear optical applications. More specifically, it concerns new families of amorphous polymers whose lateral chains contain chromophoric groups which, when oriented by a steady electrical field at a temperature close to the vitreous transition temperature, give rise to second-order non-linear optical effects. These effects can be used to produce integrated optical components such as a frequency doubler operating on wavelengths between 0.8 and 2 $\mu$m or an electrooptical modulator controlling an electromagnetic wave whose wavelength can be between 0.6 and 2 $\mu$m.

At present, it seems that "fully optical" solutions will, to a large extent, be used for future telecommunication systems and new generations of data processing systems. Passive, optically active, optoelectronic and optooptical components must be developed to match this trend.

A present, most electrooptic systems are manufactured using lithium niobate or semi-conductor materials.

However, it has now been clearly proved that many organic materials possess a greater non-linear optical activity than inorganic materials. The polarization $\vec{P}$ induced by intense illumination can be written:

$$\vec{P} = \|\chi^{(1)}\| \vec{E} + \|\chi^{(2)}\| |E|\vec{E} + \ldots$$

where $\chi^{(2)}$ is a second-order susceptibility tensor.

E is the electromagnetic field applied to the medium.

Moreover, due to the fact that the non-linear effects in organic materials are purely of electronic origin, the response times obtained with these materials are very short. Moreover, optical damage only occurs at far higher levels than in inorganic materials. Finally, the chemical structure of the organic compounds can be easily varied to adjust, in particular, the transparency and the $\beta$ hyperpolarizability value of these molecules; these two parameters vary in opposite directions.

Non-centrosymmetric materials obtained using organic molecules which produce second-order non-linear effects are:
monocrystals
Langmuir-Blodgett films
polymers.

Of these three possibilities, polymers seen the most promising since they are relatively easy to use and, consequently, inexpensive. They can be applied to large surfaces and are compatible with inorganic substrates such as semi-conductors. This combination of properties suggest they are the best material for integrated optics.

The first polymer materials proposed were solid solutions of molecules with non-zero $\beta$ hyperpolarizability in a amorphous polymer matrix (K. G. Singer, J. F. Sohn and S. J. Lahama, Appl. Phys. Lett. 49,248 (1986)), H. L. Hampsch, J. Yang, G. K. Wong and J. M. Torkelson, Macromolecules, 21,526 (1988)) or a liquid crystal polymer matrix with lateral chains. To increase the non-linear entity content, new polymers have been produced (the applicant's patent FR 2 597 109).

Up to present, considerable efforts have been devoted to obtaining materials with a high $\chi^{(2)}$ susceptibility in polymers offering second-order non-linear effects. This implies that the chemical structures in the entity which generate the second harmonic must have a high $\beta$ hyperpolarizability value and thus decreases the transparency of the material in the visible range. Consequently, these materials can only be used at wavelengths above 1 $\mu$m in frequency doublers and 0.6 $\mu$m in electrooptical modulators.

In the prior art, homopolymers with the chemical structure shown in FIG. 1, whose maximum absorption is below 350 nm, have been synthesized (Eur. Polym. J. 18 651 (1982). These materials have sufficient second-order susceptibility to be used for some applications. However, they have low vitreous transition temperatures, which tends to cause relaxation of the lateral chains after orientation and gives rise to smectic or nematic mesophases which cause light scattering phenomena unacceptable in guided-optic applications.

To satisfy the following criteria:
a polymer chemical structure whose maximum absorption wavelength is below 350 nm
$d_{33} > 5$ pm/V (a factor representing the second-order susceptibility)
a vitreous transition temperature above 80° C.
films produced from polymers with good mechanical strength and optical properties (no scattering and good transparency to the wavelength used).

SUMMARY OF THE INVENTION

This invention proposes amorphous copolymers obtained by copolymerizing an alkyl methacrylate or an alkyl acrylate or an alkyl $\alpha$acrylohalide or an alkyl acrylo $\alpha$trifluoromethyl with a monomer containing the entity that generates the second-order non-linear effects (FIG. 2). The X groups in the chromophoric entity were selected to produce highly non-linear effects; the N-$C_pH_{2p+1}$ group appears particularly advantageous since it generates no liquid crystal phase when x=1 and, unlike the prior art, this type of homopolymer could be used in guided-optics applications.

This invention is also a process to manufacture a copolymer in which the non-linear effect generator is 4 (N methacryloyloxypropyl) N methylamino 4' cyanobiphenyl, the monomer being synthesized as shown in FIG. 6. In the fourth stage of the synthesis, the use of 1-3 dimethyl-3,4,5,6-tetrahydro-2 (1H)-Pyrimidinone (DMPU), with a relatively weak base, sodium hydrocarbonate, encourages the monoalkylic reaction at the expense of the dialkylic reaction and still provides acceptable reactive efficiency.

BRIEF DESCRIPTION OF THE DRAWINGS

The invention will be better understood, and other advantages will become clear, upon reading the following description, which is not exhaustive, and by studying the appended figures including.

DETAILED DESCRIPTION OF THE INVENTION

In general, the copolymers described by the invention are preferably produced by radical polymerization using $\alpha, \alpha'$azobisisobutyronitrile (AIBN) as a starter and dimethylformamide as a solvent at 60° C. for 24 hours. The copolymer is precipitated in ethanol then washed with ether and finally dried under vacuum.

The colorant content is determined by nuclear magnetic resonance and by visible UV spectrometry. Examples of the chemical synthesis are given below:

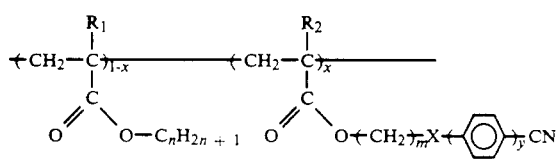

where $R_1$ is $CH_3, H, F, Cl, CF_3$ or

$R_2$ is $CH_3, H, F, Cl, CF_3$ or

x is a mole fraction depending on the type of X group if X is

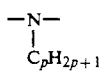

with $1 \leq p \leq 3$, then $0 \leq x \leq 1$
if X is —O— or —S— then $0 < x < 1$
$1 \leq n \leq 6$
$m = 0$ or $2 \leq m \leq 10$
$y = 1$ or $y = 2$ Preferably, the $R_1$ and $R_2$ groups are methyls.

Preferably, the X group is an oxygen with $0 < x < 1$ or a $NC_pH_{2n+1}$ group The preferred number of benzene cores is 2 and the preferred number of —CH$_2$— groups is 3 or 6.

EXAMPLE 1

This example is the synthesis of a methylmethacrylate and 4 (methacryloyloxyhexyloxy) 4′ cyanobiphenyl copolymer.

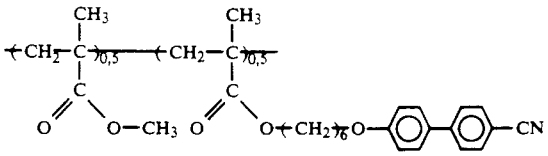

Figure 1:
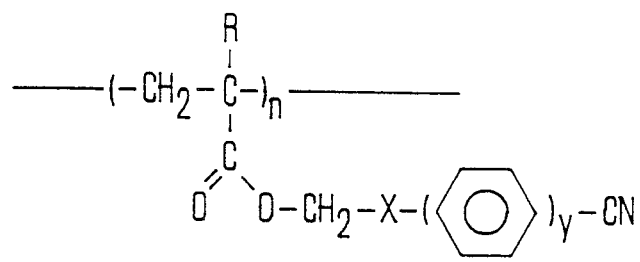
FIG. 1 showing the molecular structure of the prior art homopolymers mentioned above, FIG. 2 showing the molecular structure of a copolymer complying with the invention, FIG. 3 showing the chemical formula of a first example of a copolymer complying with the invention, FIG. 4 showing the chemical formula of a second example of a copolymer complying with the invention.
Figure 2:
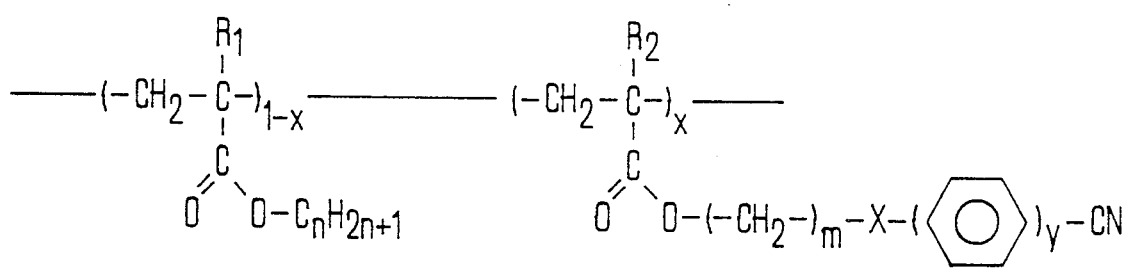
Figure 2:
Figure 2:
Figure 3:
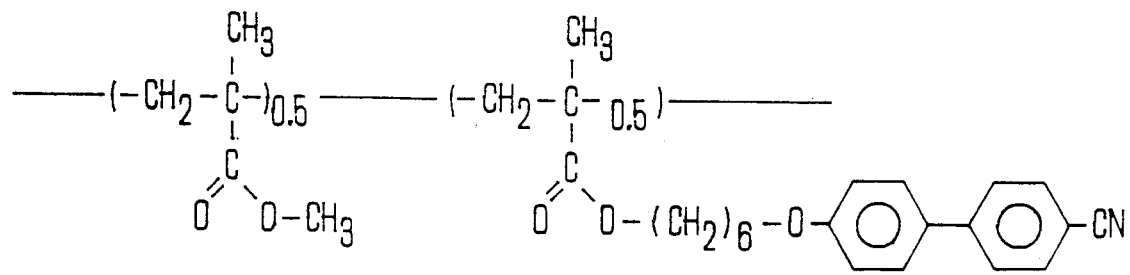
Figure 4:
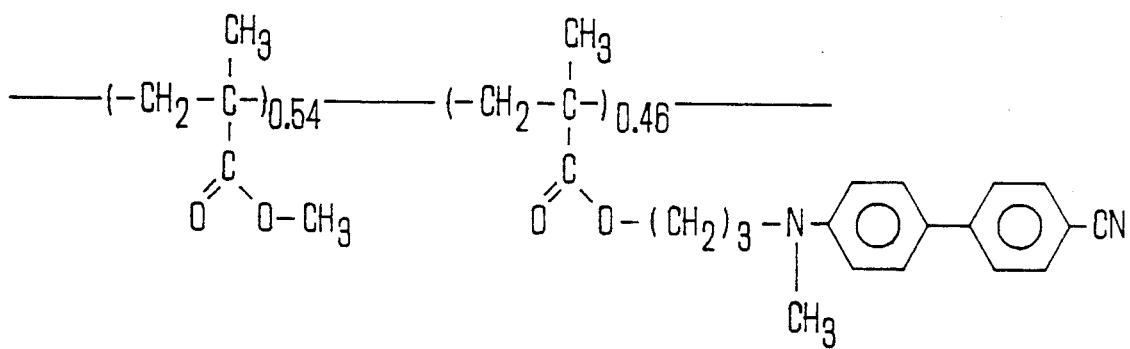
Figure 5:
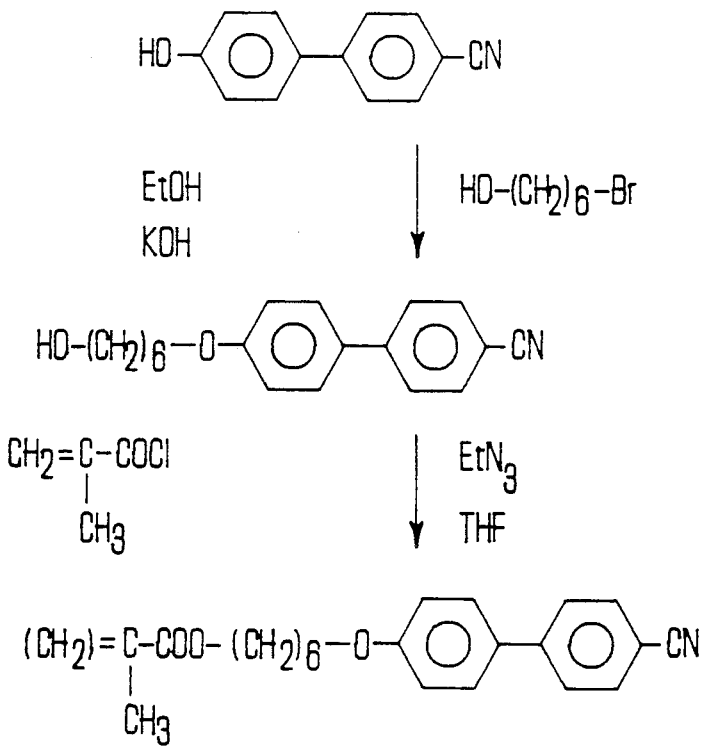
FIG. 5 is a reaction diagram of the synthesis of the colorant monomer in the first example of a copolymer complying with the invention.

4 (methacryloyloxyhexyloxy) 4′ cyanobiphenyl is synthesized from 4 hydroxy 4 cyanobiphenyl in 2 stages as represented by the reaction diagram in FIG. 5. These two stages are described in an article by V. P. SHIBAEV, S. G. KOSTROMIN and N. A. PLATE, published in Eur. Polym. J. 18 651 (1982). 4 hydroxy 4′ cyanobiphenyl is easily produced from 4 hydroxybiphenyl (for example, see J. C. DUBOIS, J. C. LAVENU and A. ZANN in "Mesomorphic order in Polymers and polymerization in liquid crystalline media" ACS symposium, series 74 A. Blumstein editor (1977) p. 86).

This polymer allows thin films to be easily formed. For example, a solution of 1,1,2 trichloroethane at 120 g/l deposits a 1.8 $\mu$m-thick film by centrifuging (N = 1000 r.p.m. mn$^{-1}$).

The polymer film (I) is dried under vacuum at 120° C. and oriented by a steady electric field. This field is created by ionizing the air feed from a metal tip at very high voltage (4 kV) using the corona method.

Polarized in this way, the polymer doubles the frequency of a YAG laser operating at 1.06 $\mu$m; the $d_{33}$ factor, representative of the material frequency-doubling performance, is 3 pm. $V^{-1}$.

EXAMPLE II

This example is the synthesis of a methyl methacrylate and 4-[(N-methacryloyloxypropyl)-N-methyl amino]-4′-cyanobiphenyl copolymer.

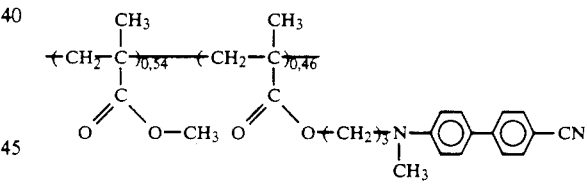

Figure 6:
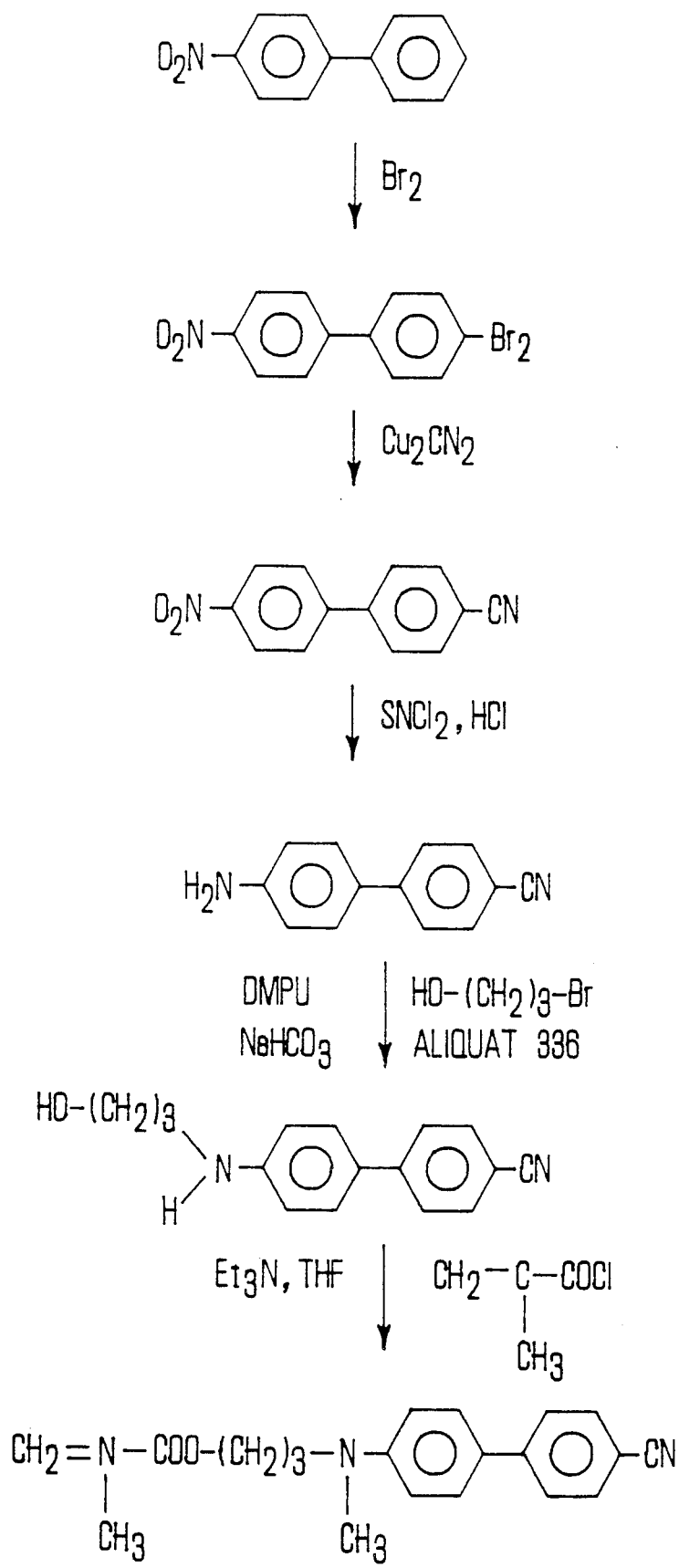
FIG. 6 is a reaction diagram of the synthesis of the colorant monomer in the second example of a copolymer complying with the invention.

4 [(N methacryloyloxypropyl) N methyl amino] 4′cyanobiphenyl is synthesized from 4 nitrobiphenyl in 6 steps as represented in the reaction diagram in FIG. 6.

The first step is accurately described in an article by R. J. W. LE FEVRE et al. published in J. Chem. Soc. pp 2041-2049 (1926).

Synthesis of 4 nitro 4′cyanobiphenyl.

20 g (7.19 10$^{-2}$ moles) of 4 nitro 4′bromobiphenyl, 11.6 of copper cyanide and 120 ml of DMF are placed in a 250 ml receptacle with a magnetic agitator. The mixture is refluxed for 5 h 30. It is then allowed to cool, acetone is added and the reaction medium is poured into 2 liters of water containing 2 g of ethylene diamine. A precipitate is formed. The solid is filtered out then washed in water and hexane. This raw product is redissolved in chloroform. The organic phase is dried on MgSO$_4$, filtered and evaporated till dry. The solid obtained is recrystallized in an ethanol-chloroform mixture. This provides 13.16 g of product, yield $\rho = 81.7\%$, melting point = 195° C.

The third step is accurately described in an article by J. RUOLIENE et al. published in Mol. Cryst. Liq. Cryst. (1981) Vol. 78 pp 211-216.

Synthesis of 4 [N (γhydroxypropyl)amino] 4'cyanobiphenyl.

8 g (0.041 moles) of 4 amino 4'cyanobiphenyl, 6.30 g (0.045 moles) of 3 bromopropanol, 3.81 g (0.045 moles) of sodium hydrogen carbonate, 80 ml of DMPU and 1 ml of 336 ALIQUAT (($C_8H_{17}$)$_3$N$^+$CH$_3$ Cl$^-$, manufactured by Henkel Corp.) in a 250 ml receptacle with a magnetic agitator. The mixture is heated to 90° C. for 15 hours.

The reaction medium is cooled then poured into water. A precipitate is formed; this is filtered-out then washed in water and hexane. The solid is dissolved in chloroform and acetone. The organic phase is dried on MgSO$_4$, filtered and evaporated till dry. The raw product is purified by chromatography in a silica column and then recrystallized in toluene. 5.15 g of product is obtained and the yield is 49.56%. A disubstitute derivative forms at the same time.

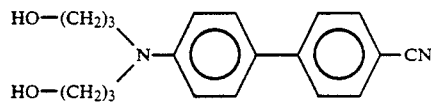

The 4[N γ hydroxypropyl) amino] 4' cyanobiphenyl has a melting point of 144° C. and a mesophase between 144° C. and 148° C.

Synthesis of 4 [N(hydroxypropyl) N methylamino] 4' cyanobiphenyl.

The procedure used is identical to that described above. The methylizing agent is methyl iodide.

Yield: 73%.

Synthesis of 4 [Nγmethacryloyloxypropyl N methyl amino] 4' cynaobiphenyl.

1.80 g (0.00676 moles) of 4 [N(γhydroxypropyl) N methylamino] 4' cyanobiphenyl is dissolved in 20 ml of dry THF in a 50 ml receptacle with a magnetic agitator. 0.82 g (8.1 mmoles) of triethylamine are then added, the reaction mixture is cooled to 5° C. and 0.85 g (8.1 mmoles of methacryloyl chloride are added drop by drop. The mixture is allowed to return to ambient temperature under constant agitation. After 2 hours, 0.82 g of triethylamine and 0.85 g of methacryloyle chloride are added. Two hours later, 0.41 g of triethylamine and 0.42 g of methacryloyle chloride are added. The mixture is agitated for 16 hours and then poured into acidulated water containing HCl. The ester precipitates. The solid is filtered-out and washed in water and then hexane. It is then dissolved in chloroform. The organic phase is dried on MgSO$_4$, filtered and evaporated till dry. The raw product is purified by chromatography in a silica column (toluene eluant) and then recrystallized in cyclohexane.

Yield: 60%

Melting point: 89° C.

λmax=349.9 nm ε=28 900 mole $l^{-1}$ cm$^{-1}$ (CHCL$^3$ solvent).

Polymer II can easily be used to produce thin films. For example, a 120 g.$l^{-1}$ solution in 1.1.2 trichloroethane gives a 1.5 μm-thick film when centrifuged at 1000 r.p.m. The factors for this polymer are n=1.59 (λ=1.06 μm) and n=1.6115 (λ=0.6328 μm). When dried at 120° C. under vacuum, this film generates the second harmonic for a YAG laser (λ=1.06 μm).

The non-linearity coefficient $d_{33}$ is 13 pm. $V^{-1}$, i.e. roughly twice the $d_{33}$ coefficient obtained with lithium niobate which is used as a reference in this field. This coefficient, determined experimentally, gives a calculated coefficient of 19 pm. $V^{-1}$ at 0.83 μm.

What is claimed is:

1. A copolymer of the formula:

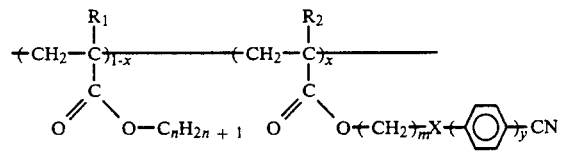

obtained by copolymerization of a monomer of the formula (I) and a monomer of the formula (II):

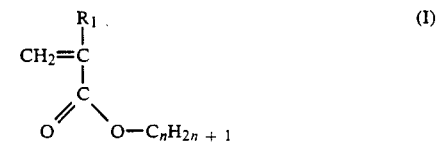

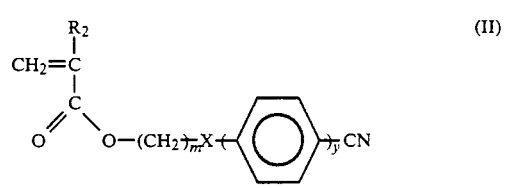

wherein $R_1$ is CH$_3$, H, F, Cl, CF$_3$ or C$_6$H$_5$, $R_2$ is independently selected from the groups for $R_1$;

X is —NC$_p$H$_{2p+1}$—, $1 \leq p \leq 3$, and $0 \leq x \leq 1$, n is from 1 to 6, m is 0 or a number from 2 to 10, y is 1 or 2, and said amorphous copolymer has a vitreous transition temperature above 80° C. and a second-order susceptibility ($d_{33}$) of >5 pm/V.

2. The copolymer of claim 1, wherein $R_1$ is CH$_3$.

3. The copolymer of claim 1, wherein $R_2$ is CH$_3$.

4. The copolymer of claim 1, wherein m is 3 or 6.

5. The copolymer of claim 1, wherein $R_1$ and $R_2$ are CH$_3$, n is 1, m is 3, p is 1, y is 2 and x is 0.46.

6. An amorphous copolymer of the formula:

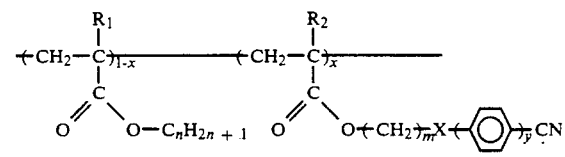

obtained by copolymerization of a monomer of the formula (I) and a monomer of the formula (II):

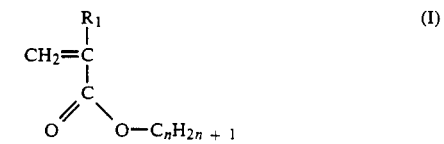

-continued

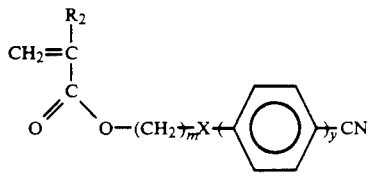
(II)

wherein
R₁ is CH₃, H, F, Cl, CF₃ or C₆H₅,
R₂ is independently selected from the groups for R₁,
X is $-NC_pH_{2p+1}-$, $1 \leq p \leq 3$, and $0.46 < x \leq 1$,
n is from 1 to 6,
m is 0 or a number from 2 to 10,
y is 1 or 2, and
said amorphous copolymer has a vitreous transition temperature above 80° C.

7. The copolymer of claim 6, wherein R₁ is CH₃.
8. The copolymer of claim 6, wherein R₂ is CH₃.
9. The copolymer of claim 6, wherein m is 3 or 6.
10. The copolymer of claim 6, wherein R₁ and R₂ are CH₃, n is 1, m is 3, p is 1, y is 2 and x is 0.46.

* * * * *